US006840095B1

(12) United States Patent
Tetzlaff et al.

(10) Patent No.: US 6,840,095 B1
(45) Date of Patent: Jan. 11, 2005

(54) EXHAUST DIAPHRAGM ASSEMBLY

(75) Inventors: Patrick C. Tetzlaff, Franklin, WI (US); James E. Macier, Beach Park, IL (US); Jonathan J. Servais, Kenosha, WI (US)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 09/559,867

(22) Filed: Apr. 26, 2000

(51) Int. Cl.[7] .............................................. G01M 19/00
(52) U.S. Cl. ...................................................... 73/118.1
(58) Field of Search ................................ 73/116, 118.1

(56) References Cited

U.S. PATENT DOCUMENTS 3,915,136 A * 10/1975 Caldwell ................ 123/119 A
5,617,833 A * 4/1997 Tomisawa et al. ......... 73/117.3
6,382,014 B1 * 5/2002 Breton ...................... 73/23.31

* cited by examiner

*Primary Examiner*—Edward Lefkowitz
*Assistant Examiner*—Maurice Stevens
(74) *Attorney, Agent, or Firm*—BRP Legal Services

(57) ABSTRACT

The present invention, in one aspect, includes a diaphragm assembly for being connected between an engine exhaust path and an engine electronic control unit to transmit changes in exhaust gas pressure from the exhaust path to the control unit. In an exemplary embodiment, the diaphragm assembly includes a diaphragm housing and a diaphragm positioned in the housing and separating a first chamber and a second chamber. The first chamber is configured to be in flow communication with the exhaust path and the second chamber is configured to be in flow communication with the engine control unit. The diaphragm housing, in the exemplary embodiment, includes a first housing member and a second housing member. An inner surface of the first housing member also is a side wall of the first chamber, and the inner surface has a conical shape to facilitate drainage of water from the first chamber. Also, the first chamber has a first volume and said second chamber has a second volume. The first volume is greater than the second volume. The diaphragm includes an o-ring and a diaphragm member integral with the o-ring. In the exemplary embodiment, the o-ring and said diaphragm member are fabricated from fluorosilicone. The first and second housing members each include an o-ring groove so that when the housing members are assembled, the diaphragm o-ring is trapped between the first and second housing members in the grooves.

11 Claims, 3 Drawing Sheets

EXHAUST DIAPHRAGM ASSEMBLY

BACKGROUND OF THE INVENTION

This invention relates generally to marine engines and, more specifically, to detecting engine exhaust gas pressure in a fuel injected or direct fuel injected engine.

Marine engines typically include a power head, an exhaust housing, and a lower unit. A drive shaft extends from the power head, through the exhaust housing, and into the lower unit. The lower unit includes a gear case, which supports a propeller shaft. One end of the propeller shaft is engaged to the drive shaft, and a propeller is engaged to an opposing end of the shaft.

In order to maintain optimum combustion, as airflow to the cylinders increases, fuel flow to the cylinders also should increase. As airflow to the cylinders decreases, fuel flow to the cylinders also should decrease.

Many variables impact airflow to the cylinders including conditions at the propeller. For example, the depth at which an engine propeller is located in the water impacts air flow through the engine, including an amount of fresh air supplied to the engine cylinders. Fuel flow to the cylinders also is adjusted based on operating parameters such as atmospheric pressure and intake air temperature. An absolute pressure sensor typically is utilized for generating a signal representative of atmospheric pressure, and a temperature sensor typically is located at the engine air intake to generate a signal representative of intake air temperature. The sensors are coupled to, or part of, an electronic control unit (ECU), which samples the signals generated by the sensors and adjusts fuel flow according to the sampled signals.

An additional parameter that has a significant impact on fresh airflow to the engine cylinders is exhaust flow. Specifically, a key parameter governing the exhaust gas flow is the gas pressure within the exhaust system. Known commercial marine engines, however, do not utilize exhaust gas pressure data in controlling the fuel/air ratio in the engine cylinders.

More specifically, and until now, the difficulties and costs associated with measuring such exhaust gas pressure for controlling the fuel/air ratio during engine operations were prohibitive in commercial marine engines. For example, the carbon and soot resulting from the combustion process can collect and block the sensor, preventing it from reading pressure. In addition, exhaust gas from an internal combustion engine contains known corrosive compounds which can damage electrical components.

BRIEF SUMMARY OF THE INVENTION

The present invention, in one aspect, includes a diaphragm assembly for being connected between an engine exhaust path and an engine control unit to transmit exhaust gas pressure from the exhaust path to the engine control unit. In an exemplary embodiment, the diaphragm assembly includes a diaphragm housing and a diaphragm positioned in the housing and separating a first chamber and a second chamber. The first chamber is configured to be in flow communication with the exhaust path and the second chamber is configured to be in flow communication with the engine control unit.

The diaphragm housing, in the exemplary embodiment, includes a first housing member and a second housing member. An inner surface of the first housing member also is a side wall of the first chamber, and the inner surface has a conical shape to facilitate drainage of water from the first chamber. Also, the first chamber has a first volume and said second chamber has a second volume. The first volume is greater than the second volume.

The diaphragm includes an o-ring and a diaphragm member integral with the o-ring. In the exemplary embodiment, the o-ring and said diaphragm member are fabricated from fluorosilicone. The first and second housing members each include an o-ring groove so that when the housing members are assembled, the diaphragm o-ring is trapped between the first and second housing members in the grooves.

Prior to operation of the engine, the diaphragm assembly is coupled to the engine so that the first chamber is in flow communication with the engine exhaust path and the second chamber is in flow communication with the engine control unit. In one embodiment, a first tube extends from an opening in the engine power head to an inlet to the first chamber, and a second tube extends from an outlet of the second chamber to a port of the control unit.

During engine operation, exhaust gas pressure is communicated to the diaphragm via the first tube. An increase in the exhaust gas pressure causes the diaphragm to compress the air in the second chamber and in the second tube. As a result, the pressure change is transmitted through the second chamber, the second tube, and to the engine control unit. The engine control unit can use such exhaust gas pressure data to control engine operations, such as to control the fuel/air ratio in the engine cylinders.

The above described diaphragm facilitates communication of engine exhaust gas pressure information to an engine control unit and protects the control unit from direct exposure to the exhaust gas.

DETAILED DESCRIPTION OF THE INVENTION

The present invention is described herein in the context of an outboard engine. The present invention could, however, be utilized in connection with a stern drive engine as well as with an outboard engine. Further, the present invention is not limited to practice with any one particular engine, and therefore, the following description of an exemplary engine relates to only one exemplary implementation of the present invention.

Figure 1:
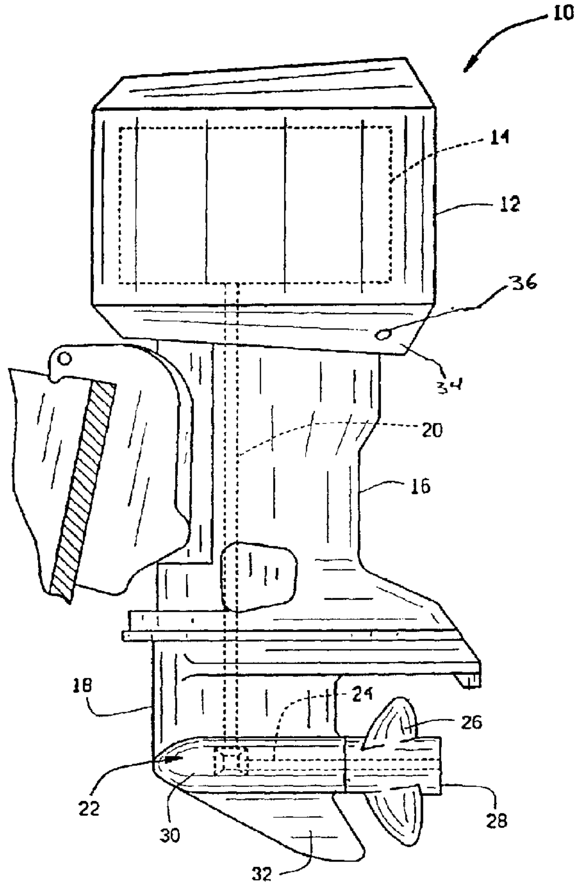
FIG. 1 is a side view of an outboard engine.

Referring more particularly to the drawings, FIG. 1 is a perspective view of an outboard engine 10, such as an outboard engine commercially available from Outboard Marine Corporation, Waukegan, Ill. Engine 10 includes a cover 12 which houses a power head 14, an exhaust housing 16, and a lower unit 18. A drive shaft 20 extends from power head 14, through exhaust housing 16, and into lower unit 18.

Lower unit 18 includes a gear case 22 which supports a propeller shaft 24. One end of propeller shaft 24 is engaged to drive shaft 20, and a propeller 26 is engaged to an opposing end of shaft 24. Propeller 26 includes an outer hub 28 through which exhaust gas is discharged. Gear case 22 includes a bullet, or torpedo, 30 and a skeg 32 which depends vertically downwardly from torpedo 30.

Power head 14 includes an internal combustion engine having an exhaust system with an exhaust outlet. Power head 14 also includes an adapter 34. A port 36 is located in adapter and typically is used for emission testing of engine 10. A main exhaust gas duct extends through adapter 34 and exhaust housing 16 and into lower unit 18 so that exhaust flows from power head 14 through the gas duct and out hub 28.

Figure 2:
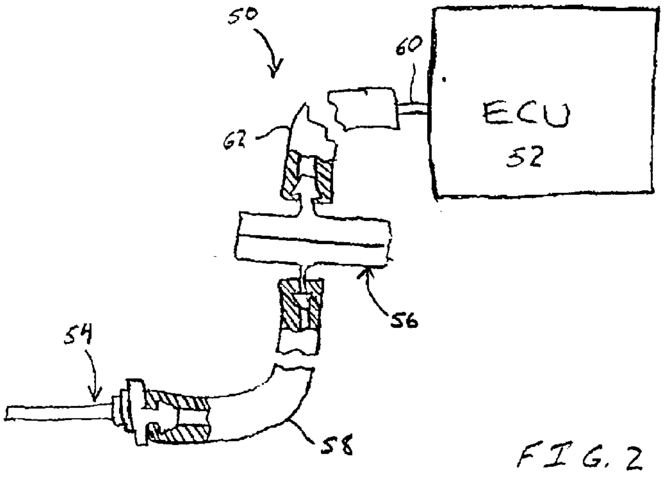
FIG. 2 is a schematic illustration of a probe and diaphragm assembly coupled to engine ECU.

FIG. 2 is a schematic illustration of a probe and diaphragm assembly 50, sometimes referred to herein as an exhaust pressure sensing system, coupled to an engine ECU 52. System 50 includes a probe 54 coupled to a diaphragm assembly 56 by a first tube 58. Diaphragm assembly 56 is coupled to ECU 52 at an ECU port 60 by a second tube 62. Generally, and with respect to engine 10 shown in FIG. 1, system 50 is located under cover 12 with probe 54 located within opening 36.

Alternatively, and rather than probe 54, diaphragm assembly 56 can be directly connected to the engine by one tube (e.g., tube 58) of sufficient length. In an exemplary embodiment, tube 58 could be provided with a threaded member at the end to be secured to the power head. Of course, alternative connectors could be used to secure tube 58 to the engine. The probe therefore is not necessarily required for use with each type of engine, and assembly 56 can be utilized with and without a probe.

Figure 3:
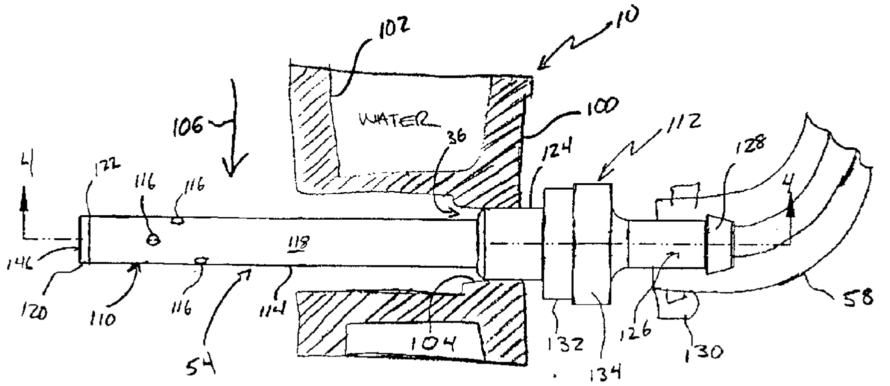
FIG. 3 is a partial cross-sectional view of a probe installed in an engine.

FIG. 3 is a partial cross-sectional view of probe 54 installed in opening 36 of engine 10. A power head case 100 of engine 10 at opening 36 includes a water jacket 102 to cool case 100. Opening 36 is defined by a threaded wall 104. An exhaust duct, or path, 106 is formed by case 100, and path 106 extends from power head 14, through exhaust housing 16, and lower unit 18 (FIG. 1).

Probe 54 includes an elongate probe body 110, and an engine engagement assembly 112 secured to probe body 110 and configured to engage to the engine so that probe body 110 at least partially extends into the engine exhaust path. Elongate probe body 110 includes a hollow, cylindrical shaped member 14 having at least one opening 116 through a side wall 118. More specifically, and in the embodiment shown in FIG. 3, three openings 116 extend through cylindrical shaped member side wall 118. Openings 116 are radially spaced about 120° apart from each adjacent opening 116. Openings 116 are not axially aligned so that exhaust cannot simply flow into one opening 116 and then out another opening 116 without any interference by probe 54. Of course, more than or fewer than three openings 116 can be utilized. Elongate probe body 110 further includes a cap 120 secured to and closing an open end 122 of cylindrical shaped member 114.

Engine engagement assembly 112 includes a threaded portion 124 sized to be threadedly engaged within opening 36, and a tube connection portion 126 sized to be inserted within tube 58. Tube connection portion 126 includes a head 128 to prevent unintended separation of probe 54 and tube 58. Tube 58 is secured to tube connection portion 126 by a locking ring 130. Assembly 112 also includes a sealing portion 132 which when probe 54 is fully tightened into opening 36, tightly fits against case 100. A hex portion 134 also is provided to facilitate securing probe 54 within opening 36 using a wrench or other mating tool.

Figure 4:
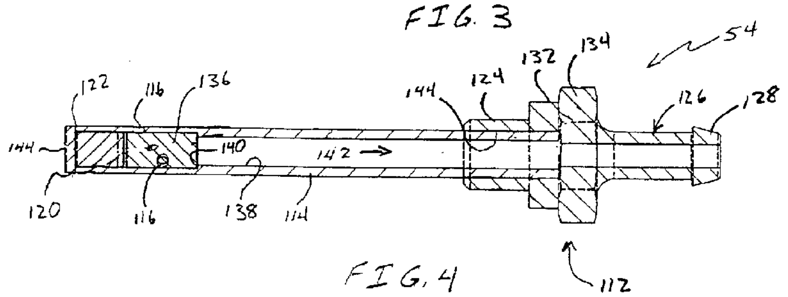
FIG. 4 is a cross-sectional view of the probe shown in FIG. 3 along Line 4-4.

FIG. 4 is a cross-sectional view of probe 54 along Line 4-4 in FIG. 3. As shown in FIG. 4, probe 54 includes a pellet 136 located within cylindrical shaped member 114. In an exemplary embodiment, pellet 136 is sintered metal. Cylindrical shaped member 114 includes an inner diameter surface 138, and a ledge 140 is formed by inner diameter surface 138. Pellet 136 is trapped between ledge 140 and cap 120 secured to and closing open end 122 of cylindrical shaped member 114. Pellet 136, in the exemplary embodiment, is at least coextensive with the location of openings 116 so that carbon and soot that may flow into probe 54 via openings 116 come into contact with pellet 136. A flow passage 142 extends longitudinally through probe 54 so that exhaust gas pressure is communicated through probe 54 and into tube 58.

Figure 5:
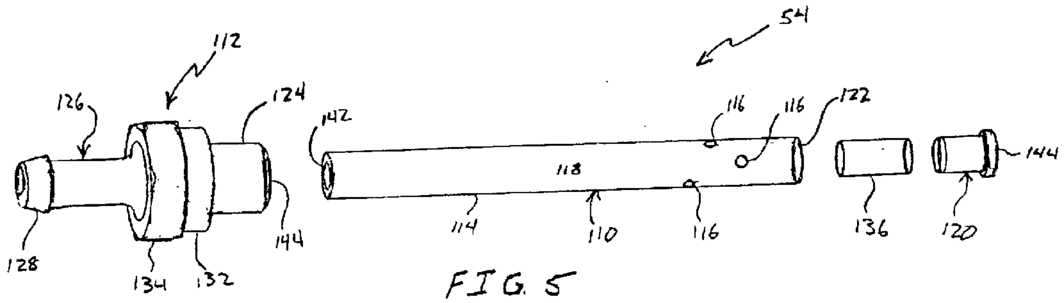
FIG. 5 is an exploded view of the probe shown in FIG. 4.

FIG. 5 is an exploded view of probe 154. As clearly shown in FIG. 5, probe 154 includes elongate probe body 110, engine engagement assembly 112, and cap 120. Elongate body 110 is press fit into engagement with engine engagement assembly 112. Specifically, a bore 144 extends though threaded portion 124, and bore 144 is sized to form a tight fit with elongate body 110. Pellet 136 is inserted into body 110, and cap 120 is sized to befit over pellet 136 and within body 110. Cap 120 forms a tight fit with body 110. Elongate body 110, engagement assembly 112, and cap 120 are fabricated, for example, from stainless steel. Pellet 136 is, for example, sintered metal.

To assembly probe 54 to power head 100, elongate body 110 is inserted through opening 36 and threaded portion 124 threadedly engages the threads of opening 36. A wrench or other tool can be used to tighted probe 54 so that seal portion 132 tightly fits against case 100. Tube 58 is then pushed over tube portion 126 and locking ring 130 securely maintains tube 58 in tight fit with portion 126. Probe tip 146 extends into exhaust duct 106 so that tip 146 is located within a hot portion of the exhaust flow during engine operation.

During engine operation, the exhaust gas emitted from each cylinder and is transmitted through and along exhaust duct or path 106. Some exhaust flows into probe 54 through openings 116, and the large particle of carbon and soot, which are naturally found in such exhaust are substantially blocked by sintered metal pellet 136 from flowing towards tube 58. That is, pellet 136 functions as a filter to prevent oil, soot, and carbon from entering and blocking passage 142. Since tip 144 is located in the hot portion of the exhaust flow, such heat is transferred to pellet 136 and to the blocked soot and carbon. The temperature within probe 54 at pellet 136 can reach a sufficiently high temperature so that the soot and carbon burn in probe 54.

Figure 6:
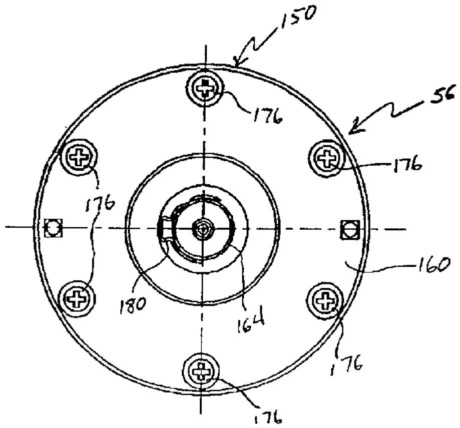
FIG. 6 is a right side view of a diaphragm.
Figure 7:
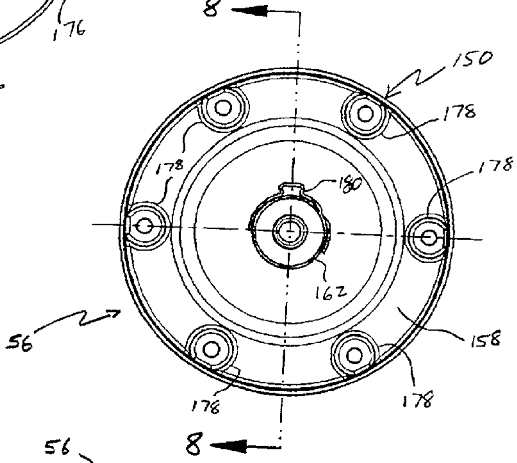
FIG. 7 is a left side view of a diaphragm.
Figure 8:
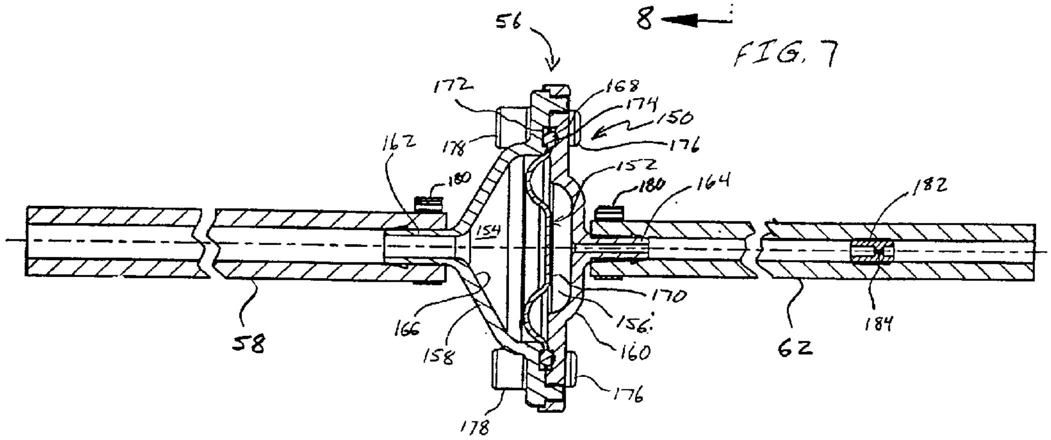
FIG. 8 is a cross-sectional view of the diaphragm shown in FIG. 7 along Line 7-7.

Referring to FIGS. 6, 7, and 8, FIG. 6 is a right side view of diaphragm assembly 56, FIG. 7 is a left side view of assembly 56, and FIG. 8 is a cross sectional view along Line 8-8 shown in FIG. 7. Diaphragm assembly 56 includes a diaphragm housing 150 and a diaphragm 152 positioned in housing 150 and separating a first chamber 154 and a second chamber 156. First chamber 154 is configured to be in flow communication with the exhaust path and second chamber 156 is configured to be in flow communication with the engine control unit.

Diaphragm housing 150 includes a first housing member 158 and a second housing member 160. Housing members 158 and 160 are fabricated using, for example, plastic molding processes. First housing member 158 has an inlet 162, and second housing member 160 has an outlet 164. An inner surface 166 of first housing member 158 also is a side wall of first chamber 154, and inner surface 166 has a conical shape to facilitate drainage of water from first chamber 154. Also, first chamber 154 has a first volume and second chamber 156 has a second volume. The first volume is greater than the second volume.

Diaphragm 152 includes an o-ring 168 and a diaphragm member 170 integral with o-ring 168. O-ring 168 and diaphragm member 170 are fabricated, for example, from fluorosilicone. First and second housing members 158 and 160 each include an o-ring groove 172 and 174 so that when housing members 158 and 160 are assembled, diaphragm o-ring 168 is trapped between first and second housing members 158 and 160 in grooves 172 and 174. First and second housing members 158 and 160 are secured together by screws 176 which extend through openings in second housing member 160 and into threaded bosses 178 of first housing member 158.

Prior to operation of the engine, diaphragm assembly 56 is coupled to the engine so that first chamber 154 is in flow communication with the engine exhaust path and second chamber 156 is in flow communication with the engine control unit. In one embodiment, first tube 58 extends from inlet 162 to probe 54, and second tube 62 extends from outlet 164 to the engine ECU. Tubes 58 and 62 are secured to inlet 162 and outlet 164 by locking rings 180.

Tube 62 may include a flow restrictor 182 to dampen pressure spikes transmitted through tube 62 to the engine ECU, resulting in the final pressure reading at the ECU representing an averaged measure of the exhaust gas pressure. Restrictor 182 may, for example, be fabricated from brass and include a reduced size flow section 184 having a through hole with a diameter of about $^{20}/_{1000}$ of an inch.

The air in second chamber 156 and tube 62 is trapped. That is, second chamber 156 and tube 62 are sealed so that air does not escape therefrom. Limiting the volume of trapped air is beneficial in that as such trapped air is heated and expands, such expanding air acts on diaphragm 152. It would be undesirable for diaphragm 152 to fully expand due to expansion of the trapped air since if diaphragm 152 fully expands into first chamber 154, it will no longer communicate an accurate pressure change from the first chamber 154 to second chamber 156. By limiting the volume of trapped air, the extent of the expansion of diaphragm 152 also is limited so that even on extremely hot days, diaphragm 152 still efficiently transmits exhaust pulses from first chamber 154 to second chamber 156.

During engine operation, changes in exhaust gas pressure are communicated to diaphragm 152 via first tube 58. The change in exhaust pressure causes diaphragm 152 to compress air in second chamber 154 and in second tube 62. As a result, the pressure change is transmitted through second chamber 154, second tube 62, and to the engine control unit. The engine control unit can use such exhaust gas pressure data to control engine operations, such as to control the fuel/air ratio in the engine cylinders.

The above described diaphragm facilitates communication of engine exhaust pressure information to an engine control unit and protects the control unit from direct exposure to the exhaust flow.

The above described diaphragm assembly 56 could be sold in kit form. In an exemplary embodiment, the kit includes diaphragm assembly 56, and a tube for connecting the diaphragm to the engine exhaust duct (e.g., directly or via a probe) and to an engine ECU. Of course, locking rings also may be included in the kit for securing the tube to the tube connector portions of the various components. The kit may also include a probe for being at least partially inserted within the exhaust flow.

While the invention has been described in terms of various specific embodiments, those skilled in the art will recognize that the invention can be practiced with modification within the spirit and scope of the claims.

What is claimed is:

1. A diaphragm assembly for being connected between an engine exhaust path and an engine control unit, said diaphragm assembly comprising:

a diaphragm housing; and a diaphragm positioned in said housing and separating a first chamber and a second chamber, said first chamber configured to be in flow communication only with the engine exhaust path, and said second chamber configured to be in flow communication only with the engine control unit.

2. A diaphragm assembly in accordance with claim 1 wherein said diaphragm housing comprises a first housing member and a second housing member, said diaphragm between said first and second housing members.

3. A diaphragm assembly in accordance with claim 2 wherein an inner surface of said first housing member also is a side wall of said first chamber, said inner surface having a conical shape to facilitate drainage of water from said first chamber.

4. A diaphragm assembly in accordance with claim 1 wherein said first chamber comprises a first column and said second chamber comprises a second volume, said first volume greater than said second volume.

5. A diaphragm assembly in accordance with claim 1 wherein said diaphragm comprises an o-ring and a diaphragm member integral with said o-ring.

6. A diaphragm assembly in accordance with claim 5 wherein said o-ring and said diaphragm member are fluorosilicone.

7. A diaphragm assembly in accordance with claim 5 wherein said diaphragm housing comprises an o-ring groove for receiving said o-ring.

8. A diaphragm assembly in accordance with claim 5 wherein said diaphragm housing comprises a first housing member and a second housing member, said first and second housing members each comprising an o-ring groove so that when said housing members are assembly, said diaphragm o-ring is trapped between said first and second housing members in said grooves.

9. A method for securing a diaphragm assembly to an engine, said method comprising the steps of:

coupling an inlet of the diaphragm assembly in flow communication only with an exhaust path of the engine; and coupling an outlet of the diaphragm assembly only with an electronic control unit of the engine.

10. A method in accordance with claim 9 wherein coupling an inlet of the diaphragm assembly in flow communication with an exhaust path of the engine comprises the steps of:

at least partially inserting a probe through an opening in the engine;

securing the probe in place so that at least a portion of the probe extends into an exhaust path of the engine;

engaging one end of a tube to the probe so that during engine operation, exhaust pulses sensed by the probe are transmitted through the probe to the tube; and engaging a second of the tube to the inlet of the diaphragm assembly.

11. A method in accordance with claim 10 wherein securing the probe in place comprises the step of threadedly engaging the probe within an opening in the engine.

* * * * *